Figure 3:
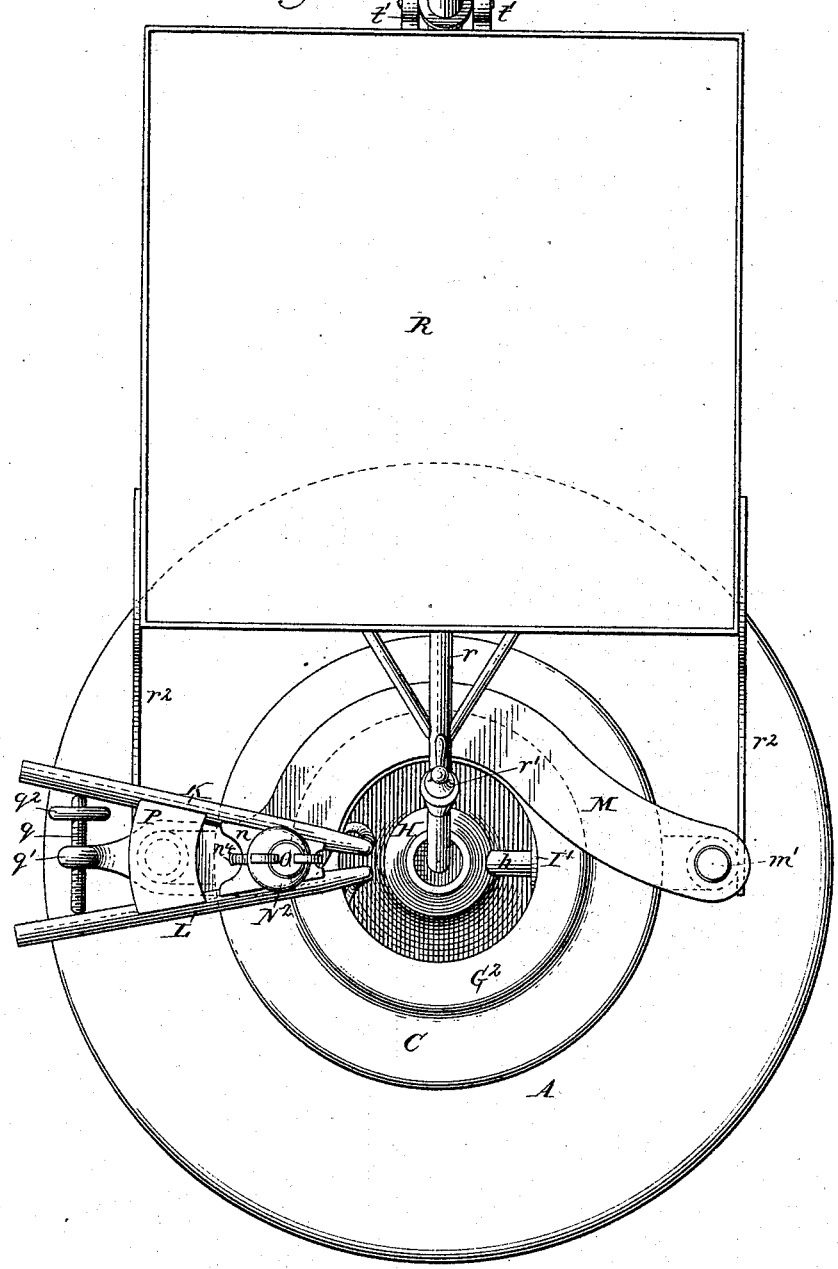

(No Model.) 4 Sheets—Sheet 1.
F. HART.
CENTRIFUGAL CREAMER.
No. 540,385. Patented June 4, 1895.
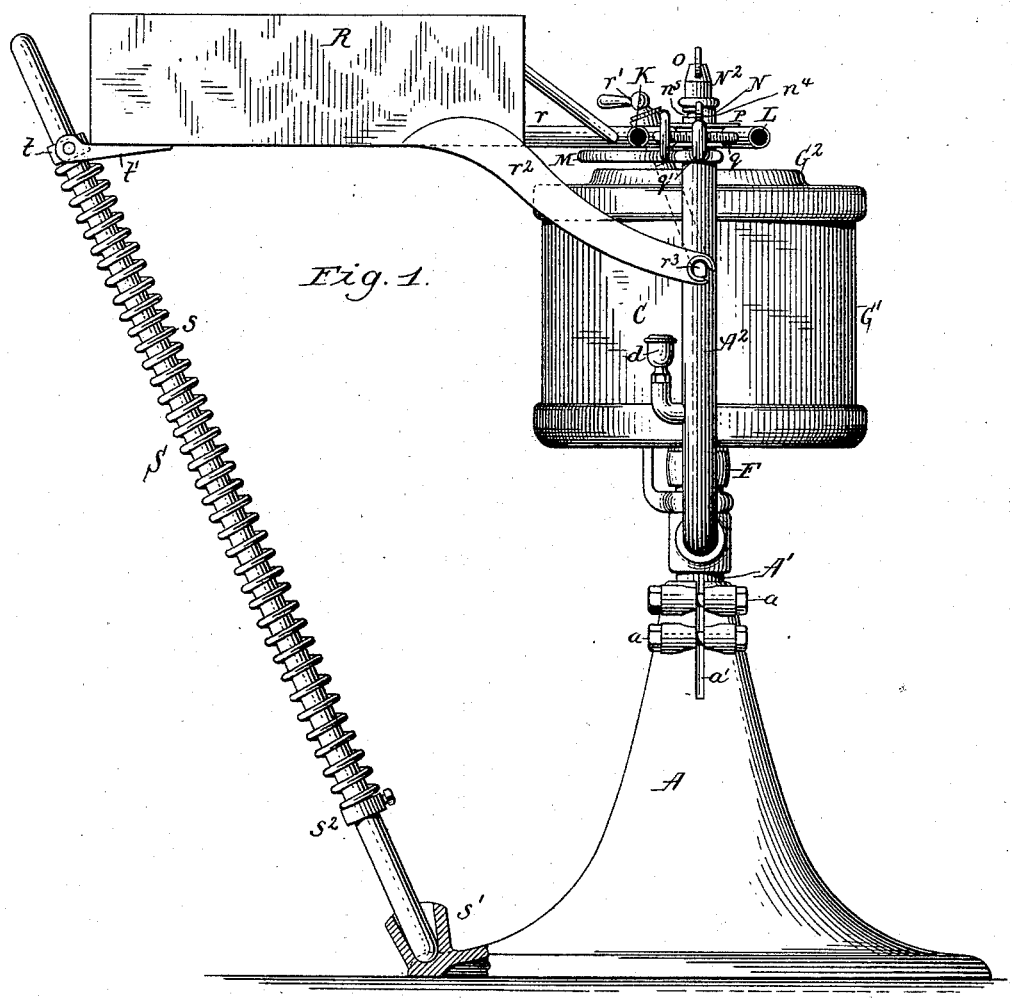
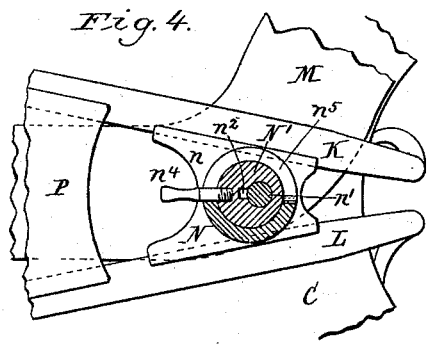
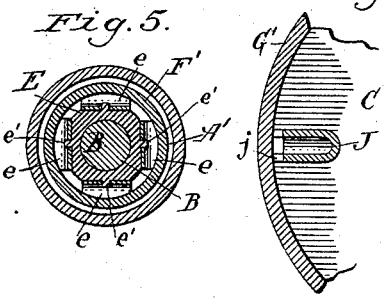

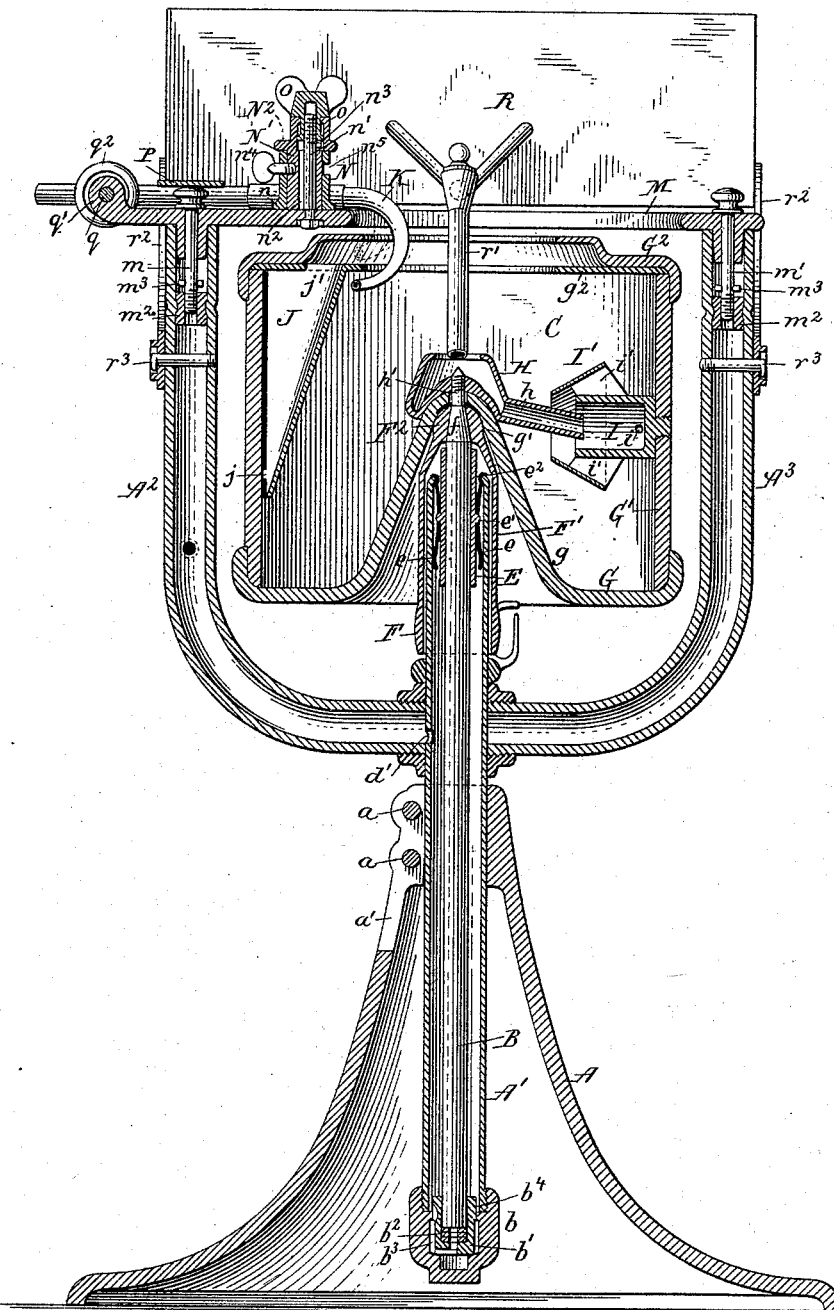

(No Model.) 4 Sheets—Sheet 3.

F. HART.
CENTRIFUGAL CREAMER.

No. 540,385. Patented June 4, 1895.

Witnesses: Chas. J. Buchheit, Geo. Buchheit Jr.

Inventor: F. Hart
By Wilhelm Bonner
Attorneys.

(No Model.) 4 Sheets—Sheet 4.
F. HART.
CENTRIFUGAL CREAMER.
No. 540,385. Patented June 4, 1895.
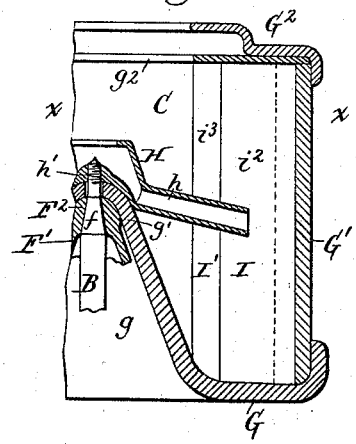
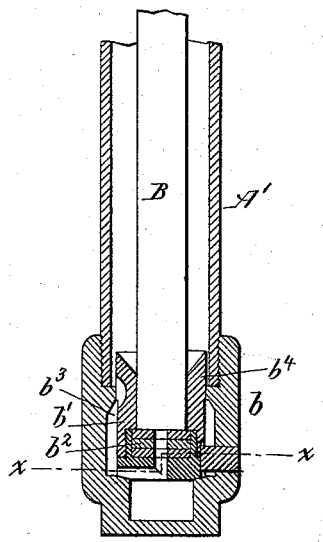
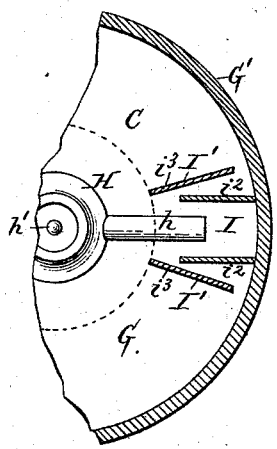
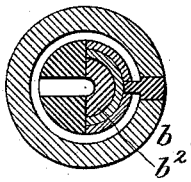
Witnesses:
Chas. J. Buchheit
Geo. J. Buchheit Jr.
F. Hart Inventor.
By Wilhelm Bonner
Attorneys.

UNITED STATES PATENT OFFICE.

FREDERICK HART, OF POUGHKEEPSIE, ASSIGNOR TO D. H. BURRELL & CO., OF LITTLE FALLS, NEW YORK.

CENTRIFUGAL CREAMER.

SPECIFICATION forming part of Letters Patent No. 540,385, dated June 4, 1895.

Application filed February 28, 1888. Serial No. 265,592. (No model.)

*To all whom it may concern:*

Be it known that I, FREDERICK HART, of Poughkeepsie, in the county of Dutchess and State of New York, have invented new and useful Improvements in Centrifugal Creamers, of which the following is a specification.

One of the objects of this invention is to construct the spindle and its supporting parts in such manner that the rotating parts will revolve about their center of gravity, even when the bowl or drum is somewhat out of balance, thereby avoiding the necessity heretofore existing, of perfectly balancing the bowl, which operation requires great care, involves considerable time and labor and is one of the principal items of the cost of such machines.

Another object of my invention is to construct the support of the skimming pipes in such manner that they cannot be injured by unskillful handling in removing and applying these pipes.

Another object of my invention is to construct the feeding device within the bowl in such manner that the velocity of the inflowing milk is rapidly reduced to a state of comparative quiescence.

Another object of my invention is to improve the construction of the skim milk discharge pipe, so that the skim milk escapes from the bowl slowly and without violent motion.

Another object of my invention is to improve the construction of the receptacle into which the full milk is placed preparatory to feeding it to the bowl.

My invention consists to these ends of the improvements which will be hereinafter fully described and pointed out in the claims.

In the accompanying drawings, consisting of four sheets, Figure 1 is a side elevation of a centrifugal creamer provided with my improvements. Fig. 2 is a vertical section thereof on an enlarged scale. Fig. 3 is a top plan view thereof. Fig. 4 is a top plan view, partly in section, of the skimming-pipes and connecting parts. Fig. 5 is a horizontal section through the upper portion of the spindle on an enlarged scale. Fig. 6 is a horizontal section through the skim-milk discharge-pipe. Fig. 7 is a vertical section of the bowl, showing a modified construction of the receiving-pocket. Fig. 8 is a horizontal section in line $x\,x$, Fig. 7. Fig. 9 is a horizontal section showing another modified construction of the receiving-pocket. Fig. 10 is a vertical section of the step-bearing on an enlarged scale. Fig. 11 is a horizontal section in line $x\,x$, Fig. 10.

Like letters of reference refer to like parts in the several figures.

A represents the pedestal or supporting base of the machine, and A' a stationary tubular standard secured in the upper portion of the pedestal A, by clamping bolts $a$, which pass through a vertical slit $a'$, in the pedestal, so that the standard can be vertically adjusted, if desired.

B represents the rotating spindle arranged axially within the tubular standard A', and extending above the upper end thereof. The lower end of the tubular standard A', is closed by a cup $b$, in which is arranged a step bearing $b'$, which receives the lower end of the spindle, suitable supporting washers $b^2$, being interposed between the lower end of the spindle and the bottom of the step bearing. The latter is provided in its surface with an oil passage $b^3$, which extends downwardly on the outer surface of the step bearing and through the bottom of the latter, the washers $b^2$, being provided with perforations which permit the oil to pass upwardly to the spindle. The washers are slightly larger than the spindle and are seated in the lower removable part of the step which is prevented from accidental unscrewing by a suitable locking pin.

The step bearing $b'$ is provided with an external collar $b^4$, which fits a thin internal projection in the cup $b$, and the bottom of the step bearing is slightly convex, which allows the step bearing a slight oscillation and enables it to come into absolute line with the spindle.

$A^2\,A^3$ represent two arms secured with their lower ends to the standard A', above the pedestal A, and extending outwardly from said standard and upwardly on diametrically opposite sides of the bowl C, which latter is mounted upon the upper end of the spindle B. The arms $A^2\,A^3$, are made hollow or tubular and one of them (in the drawings the arm $A^2$) is provided with an oil cup $d$, arranged slightly below the upper end of the standard A′, through which oil is supplied to the interior space of the arm A² and standard A′, which latter is provided with an opening $d'$, by which it communicates with the arm A².

E represents the upper bearing of the spindle arranged in the upper portion of the standard A′, and projecting slightly above the same. This bearing is somewhat smaller than the internal diameter of the standard A′, and is yieldingly held in the latter by springs $e$, which are interposed between the bearing and the standard. As shown in the drawings, the bearing is provided on its outer surface and about midway of its height with teats or short projections $e'$, to which the springs are applied by means of perforations formed in the latter.

The upper ends of the springs are slightly bent into the form of shallow hooks $e^2$, which engage over the slight burr or inwardly turned edge at the top of the standard A′, and hold the bearing in position on the standard.

F represents the driving pulley which surrounds the standard A′, below the bowl and above the arms A² A³. This pulley is provided with an upwardly extending sleeve F′, which is secured to the upper end of the spindle B, above the bearing E, and which covers the bearing and standard. The upper end of the sleeve F′, is provided with a spherical knuckle F², which surrounds the tapering shank $f$, of the spindle to which the sleeve F′, is secured. By this arrangement of the hollow standard and sleeve-pulley, absolute certainty of lubrication is obtained. The upper bearing is located as near the center of gravity as possible, and dust is effectually excluded from the bearings. Both the top and bottom bearings are arranged in the same bath of oil, but the oil is prevented from running out, when the machine stops.

G represents the bottom of the bowl or drum provided with an upwardly projecting hollow hub $g$, which is provided at its apex with a spherical seat $g'$ by which the bowl rests upon the spherical knuckle of the sleeve F′. This spherical support is arranged as nearly as practicable in the center of gravity of the bowl, so that the latter will remain on this support under a high rotative speed without any fastening. The tubular standard A′, is somewhat elastic and flexible, as is also the spindle, and the latter has a certain lateral freedom of adjustment in the standard by reason of the movable upper bearing E, whereby these parts are enabled to adjust themselves and permit the bowl to adjust itself to a running balance, in case the bowl should be somewhat out of balance. This does away with the necessity of accurately balancing the bowl, which is a considerable item of expense in centrifugal creamers, as heretofore constructed, and produces a machine which is nevertheless perfectly safe and steady in its operation. The construction of the spindle and its inclosing parts insures a perfect lubrication of these parts, excludes dust, &c., and permits the parts to be readily removed and replaced.

The application of the power to the spindle, by means of the sleeve-pulley, above the upper spindle bearing within the hollow tube near the center of gravity of the bowl, is an important element in securing a steady running machine, and the immersion of this bearing in an oil bath and its protection by the sleeve-pulley greatly reduces the friction and wear.

G′ represents the peripheral wall of the bowl, and G² the annular cover secured to the upper end of the wall G′.

$g^2$ represents the annular horizontal diaphragm arranged between the upper end of the peripheral wall G′, and the cover G².

H represents the feed-cup which receives the full milk in the center of the bowl, and which rests upon the raised central portion of the hub $g$. This cup is provided with a lateral discharge tube $h$, through which the full milk is delivered toward the peripheral wall of the bowl. The cup H, is provided in its bottom with a screw threaded perforation by which it is secured to the screw threaded upper shank $h'$, of the spindle. The opening in the hub through which the shank $h'$, passes is somewhat larger than this shank in order to afford the bowl the necessary freedom of movement on the knuckle of the spindle. The cup H, serves as a screw nut which prevents the bowl from jumping when the machine is first started and before the bowl reaches approximately its normal speed.

I is a receiving pocket secured to the peripheral wall of the bowl opposite the discharge pipe $h$, so as to receive the full milk therefrom. The pocket I, is provided in its side with a small perforation $i$, through which the milk passes from the pocket into the bowl in a fine stream, when the milk is first turned on, so as not to disturb the balance of the bowl. The pocket is surrounded by a tapering annular shield I′, which is secured to the pocket or directly to the bowl by a suitable attachment, for instance arms $i'$, and which directs the milk toward the peripheral wall at a very low speed, and prevents such milk from agitating the milk already in the bowl and interrupting the annular wall of separated cream.

The receiving pocket I, receives the impact of the stream of milk discharged by centrifugal force from the pipe $h$, and causes the milk to flow quietly over the edge of the pocket I, and down between the shield I′, and the side of the pocket into the bowl, thereby preventing the interference with the separation which would result from a violent stream of inflowing milk.

Instead of forming the pocket I, in the shape of a cup, as represented in Fig. 2, the pocket and the shield may be formed by upright blades or partitions extending throughout the entire length of the bowl, as represented in Figs. 7 and 8, in which $i^2$ $i^2$ represent the walls of the pocket, and $i^3$ $i^3$ the walls of the shield; or the pocket may be constructed to discharge on one side only, as represented in Fig. 9, in which $i^4$ represents the wall of the pocket, $i^5$ the shield and $i^6$ the imperforate radial plate, which compels the milk to rotate with the drum.

J represents the outlet trough or pipe for the discharge of the skim milk, arranged in the bowl diametrically opposite the receiving cup I. This pipe is V-shaped in cross section, as represented in Figs. 2 and 6, and has its open end turned toward the peripheral wall G', of the bowl, so as to receive the skim milk which is driven against the peripheral wall. The open vertical side of the passage J, is held at a short distance away from the peripheral wall by short projections or feet $j$, formed on the vertical edges of the passage J, and bearing against the peripheral wall G'. The upper end of the passage J, is connected with the annular diaphragm $g^2$, which latter is provided with an opening $j'$, through which the skim-milk is discharged from the passage J, into the space between the diaphragm $g^2$, and the cover $G^2$. The passage J, tapers in a radial direction and downwardly, as represented in Fig. 2. The vertically elongated passage J, permits the skim milk to pass out of the bowl slowly without violent motion, thereby preventing the formation of whirlpools or currents toward the outlet which would interfere with the separation.

K represents the skimming pipe through which the separated cream is discharged from the bowl, and L represents the skimming pipe through which the skim milk is discharged from the annular space between the cover $G^2$, and the annular diaphragm $g^2$.

M represents a horizontal cross-piece or yoke which extends over the bowl, and is secured to the upper ends of the arms $A^2$ $A^3$, by vertical screws $m$ $m'$, which engage in screw nuts $m^2$, secured in the arms $A^2$ $A^3$, by indenting the arms or otherwise. Each screw $m$ $m'$, is preferably provided with a stop pin $m^3$, between its threaded portion and the yoke, and with a head above the yoke, whereby the screws are prevented from becoming detached from the yoke, while they are allowed the requisite lengthwise movement to enter into and unscrew from the screw nuts.

The horizontal portions of the skimming pipes K L, rest upon the yoke M, while their inner ends are curved downwardly and outwardly, the point of the cream pipe K, projecting underneath the annular diaphragm $g^2$, and the point of the skim milk pipe L, underneath the cover $G^2$, in a well known manner. It follows from this arrangement of the points of these pipes that the points will come in contact with the overhanging parts of the bowl when the points are raised without being first moved inwardly or toward the axis of the drum, and it is one of the objects of my invention to render such a movement impossible and avoid the injuries to the delicate points of the pipes which are liable to result therefrom.

N represents a vertical sleeve arranged between the converging pipes K L, on the inner side of the fastening screw $m$, and resting on the yoke M.

$n$ represents a horizontal tapering plate or flange formed on the sleeve N, at the base thereof and connected with the pipes K L, which are secured to the converging lateral edges of this plate by soldering or otherwise, said edges being recessed to fit snugly against the pipes.

N' is an eccentric arranged within the sleeve N, and turning upon a vertical bolt $n'$, which is secured to the yoke M. The bore of the eccentric N', is provided with a vertical groove $n^2$, and the bolt $n'$, with a projection or nose $n^3$, which registers with the groove $n^2$, only when the eccentric N', is in its innermost position.

$n^4$ represents a thumb-piece secured to the eccentric N', and moving in a semi-circular horizontal slot $n^5$, formed in the sleeve N.

$N^2$ represents the flanged top part of the eccentric N' cast in one piece with it and resting on the sleeve N.

O represents a screw nut applied to the upper threaded end of the bolt $n'$, and attached to the eccentric N', by the top flange $o$, of the part $N^2$, being spun over the flange of the nut O, after the flanged stem of the nut has been inserted. This prevents the nut from being detached and dropped into the bowl and avoids loose parts.

P represents a covering plate which is secured to the pipes K L, and extends over the fastening screw $m$, so as to prevent access to said screw so long as the pipes K L, are in place on the yoke M.

$q$ represents a horizontal transverse adjusting screw arranged between the pipes K and L, and working in a threaded ear $q'$ formed on the yoke M, and extending outwardly beyond the fastening screw $m$. The screw $q$, is provided with a collar $q^2$, by which it can be turned for adjusting the pipes K and L, laterally, which can be effected upon releasing the screw nut O.

The eccentric N', arranged parallel with the axis of the bowl forms a pivot on which the skimming pipes are turned by means of the sleeve N, and screw $q$, for giving the points of the pipes the fine working adjustment which may be required for properly removing the separated liquids from the bowl.

The plate P, prevents the yoke M from being detached and the pipes K and L, from being raised with the yoke, while the pipes are in their operative position within the bowl.

In the position of the parts represented in Figs. 2, 3 and 4, the pipes K and L, are in their operative position in the bowl and the eccentric N', is in its outermost position. Upon removing the nut O, and by giving the eccentric N', a half turn by means of the thumb piece $n^4$, the sleeve N, with the flange $n$, and the pipes K L, attached to said flange are moved inwardly far enough to cause the points of said pipes to clear the diaphragm $g^2$ and the cover $G^2$. The pipes K L, can now be raised out of the bowl together with the sleeve N, plate $n$ and eccentric N'. The groove $n^2$, in the bore of the eccentric registers in this position of the parts with the nose $n^3$, of the bolt $n'$ and permits the eccentric to be raised from the bolt. After the pipes and their attachments have been so removed, access can be had to the fastening screw $m$, and the yoke M, can now be removed, if desired. In order to replace the skimming pipes K L, the eccentric N', must be placed in its innermost position, in which its groove $n^2$, registers with the nose $n^3$, and in which the points of the pipes clear the cover $G^2$, and the diaphragm $g^2$, of the bowl. The pipes are lowered in this position until the sleeve N, and eccentric N', rest upon the yoke, when by giving the eccentric a half turn in an opposite direction, the pipes are moved outwardly into their operative position. They are then adjusted by the screw $q$, and are clamped in position by the nut O. By this means the proper clearance of the points of the pipes is insured both in removing and applying the pipes and injury to the same by unskillful handling is rendered impossible.

R represents the milk receptacle consisting of an open box of rectangular or other suitable shape and arranged at a suitable height above the bowl and one on side thereof.

$r$ represents the discharge pipe arranged at the end of the receptacle next to the bowl and provided with a faucet $r'$, which delivers the milk into the central feed cup H.

$r^2$ $r^2$ represent arms secured to the milk receptacle and hung upon horizontal pivots $r^3$ $r^3$, which are secured to the arms $A^2$ $A^3$, of the standard A'. These pivots are arranged in line with the discharge end of the faucet $r'$, so that the location of this discharge point is not materially changed by swinging the receptacle on its pivots. The outer end of the receptacle is movably supported by a brace S, and spring $s$, applied thereto. The brace S, rests loosely in a socket $s'$, formed on the base of the pedestal A, and the spring $s$, rests on a collar $s^2$, secured to the lower portion of the brace S.

The receptacle R, is provided with a collar $t$, which encircles the brace S, and rests upon the upper end of the spring $s$. The collar $t$, is swiveled between arms $t'$, secured to the outer end of the receptacle. When the latter is full of milk, the spring $s$, is compressed, but as the weight on the spring is reduced by the gradual discharge of the milk, the spring expands and raises the outer end of the receptacle automatically in such manner as to maintain the level of the milk in the receptacle practically at a uniform height above the nozzle of the faucet $r'$, thereby insuring a uniform supply of milk to the bowl.

I claim as my invention—

1. The combination with the bowl, of a pedestal provided at its upper end with a clamping device, a hollow standard capable of vertical movement in the upper end of the pedestal and secured by the clamping device, and a spindle journaled in said standard, substantially as set forth.

2. The combination with the bowl provided with a raised hollow hub, of a hollow standard extending into said hub, a spindle journaled in said standard and extending above the same, and a sleeve pulley secured with its upper end to said spindle between the upper end of the standard and the lower side of the hollow hub and extending downwardly below the bowl, substantially as set forth.

3. The combination with the bowl provided with a raised hollow hub having a spherical seat at its apex, of a hollow standard extending into said hub, a spindle journaled in said hollow standard and extending above the same, and a sleeve pulley secured to said spindle above the standard and provided with a spherical knuckle upon which the hub rests, substantially as set forth.

4. The combination with the bowl provided with a raised hub having a spherical seat, of a hollow standard, a spindle journaled in the standard and extending through the hub, a sleeve pulley secured to the spindle above the standard and provided with a spherical knuckle, and a screw nut applied to the spindle above said hub, substantially as set forth.

5. The combination with the bowl and the feed cup attached thereto, of a peripheral receiving pocket, and a shield arranged opposite said pocket, substantially as set forth.

6. The combination with the bowl provided with an annular cover $G^2$ and below said cover with an annular diaphragm $g^2$ which has an opening $j'$, of a downwardly tapering discharge pipe J having its upper end communicating with the opening $j'$, and having an elongated vertical opening which extends downwardly along the peripheral wall of the bowl, substantially as set forth.

7. The combination with the bowl, the stationary frame and the yoke removably attached to the frame, of a skimming pipe, an adjustable support attached to the yoke, whereby the skimming pipe can be moved toward and from the axis of the bowl, and a cover which prevents access to the fastening of the yoke when the skimming pipe is in position, substantially as set forth.

8. The combination with the bowl, the stationary frame and the yoke, of a skimming pipe, a support for the skimming pipe attached to the yoke and made movable toward and from the axis of the bowl, and a standard on which said support can be moved toward and from the top of the bowl, substantially as set forth.

9. The combination with the bowl, the stationary frame and the yoke removably attached to the frame, of a skimming pipe, an adjustable support connected with the skimming pipe and attached to the yoke, and a cover which is secured to the skimming pipes and which covers the yoke fastening, substantially as set forth.

10. The combination with the bowl and the yoke, of a skimming pipe, an adjustable support for the skimming pipe, and a stop provided on said adjustable support whereby the skimming pipe is prevented from being raised before it is moved inwardly to clear the bowl, substantially as set forth.

11. The combination with the bowl, the yoke and the skimming pipe, of the sleeve N connected with the skimming pipe, the eccentric N′ arranged within said sleeve, and a fastening bolt passing through said eccentric and the yoke, substantially as set forth.

12. The combination with the bowl, the yoke and the skimming pipe, of the sleeve N connected with the skimming pipe, the eccentric N′ arranged within said sleeve and provided in its bore with a groove $n^2$ and a fastening bolt passing through the bore of the eccentric and provided with a nose $n^3$, substantially as set forth.

13. The combination with the bowl, the yoke and the skimming pipe, of the sleeve N connected with the skimming pipe, the eccentric N′ arranged within said sleeve, the screw bolt passing through the eccentric, and the screw nut permanently attached to the eccentric and having a limited axial movement therein, substantially as set forth.

14. The combination with the standard A′, provided with arms $A^2$ $A^3$ having screw nuts $m^2$, secured in their upper portions, of the yoke M provided with screws $m$ $m'$ having heads above the yoke, and stops $m^3$ below the yoke, substantially as set forth.

15. The combination with the bowl, the yoke and the skimming pipes, of the sleeve N attached to the skimming pipes, a support attached to the yoke on which said sleeve turns, a screw threaded ear $q'$ formed on an extension of the yoke, and a lateral adjusting screw $q$ working in said ear and bearing against the skimming pipes, substantially as set forth.

16. The combination with the bowl, and the feed cup attached thereto, of the stationary frame, a feed receptacle pivoted to said frame, and a discharge nozzle attached to the feed receptacle and terminating in line with the pivots thereof, substantially as set forth.

17. The combination with the bowl, of a pivoted feed receptacle and an automatic lifter whereby the feed receptacle is automatically tilted and the liquid is discharged therefrom, substantially as set forth.

18. The combination with the bowl and the stationary frame, of a feed receptacle pivoted to said frame, a brace connected with said frame, and a spring attached to said brace and supporting the feed receptacle, substantially as set forth.

Witness my hand this 16th day of February, 1888.

FREDERICK HART.

Witnesses:
 ALBERT STORY,
 GEO. W. SEARLES.